3,463,788
CONJUGATED ACETYLENIC KETONE AND
PARASITICIDE THEREOF
Roland Chretien, Paris, and Georges Wetroff, Le Thillay, France, assignors to Produits Chimiques Pechiney-Saint-Gobain, Neuilly-sur-Seine, France
No Drawing. Filed Mar. 16, 1966, Ser. No. 534,658
Claims priority, application France, Mar. 18, 1965, 9,752
Int. Cl. C07d *63/12, 13/00, 5/16*
U.S. Cl. 260—332.3                                       4 Claims

ABSTRACT OF THE DISCLOSURE

A conjugated acetylenic ketone having the general formula R—SO—C≡C—C≡C—R' in which R and R' is a heterocycle having a pentagonal, hexagonal or condensed nuclei heterocyclic residue containing a heteroatom of oxygen, sulphur or nitrogen and in which R' represents in addition an organic group such as methyl, ethyl, phenyl, indenyl, naphthyl and anthracenyl and a parasiticide formed thereof.

---

This invention relates to a new family of compounds identified as conjugated acetylenic ketones in which the molecule contains one or more heterocycles having at least one heteroatom and it relates also a process for preparation of such compounds and the use of same as a parasiticide.

The anti-fungal activity of phenyl-1 hexadiyne-2,4 one-1 is known; however, such compound has very little activity against parasitic fungi such as *Trichophyton interdigitale, Aspergillus niger, Glomerella cingulata*, etc. In order to obtain a desirable effect, large dosages of such compound are necessary.

On the other hand, the compounds of this invention are highly effective thereby to enable use in relatively low concentrations for inhibiting parasitic organisms.

The compounds of this invention comprise conjugated acetylenic ketones containing one or several heterocycles having at least one heteroatom, as represented by the general formula

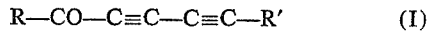

and its isomer

in which R and R' represent a pentagonal, hexagonal or condensed nuclei heterocyclic residue having at least one heteroatom such as oxygen, sulphur and nitrogen and having substituent groups such as alkyl, as represented by methyl, ethyl, butyl, propyl, isopropyl and the like; acyl, as represented by acetyl, propionyl, ethanoyl, isobutyryl and the like; halogeno, trihalogenomethyl, hydroxyl, alkoxyl as represented by methoxyl, ethoxy, butoxyl and the like, amino, amido, dialkylamino as represented by dimethylamino, diethylamino, ethylmethylamino and the like, dialkylamido and nitro groups. In addition, R' can represent an alkyl group such as methyl, ethyl, or a radical having a simple or condensed benzenic nucleus such as phenyl, indenyl, naphthyl, anthracenyl, in which the benzenic nucleus may have substituent groups such as alkyl, acyl, halogeno, trihalogenomethyl, hydroxyl, alkoxyl, amino, amido, dialkylamino, dialkylamido and nitro groups, as previously defined for R.

Amongst the heterocyclic residues, reference can be made to the groups comprising at least one oxygen atom, such as derived from furan, pyran, coumarone; the groups comprising at least an atom of sulphur, such as derived from thiophene, thiopyran, thiocoumarone; the groups comprising at least one nitrogen atom such as derived from pyrrol, pyridine, indol, quinoline, imidazole, pyrazole, triazole, tetrazole, diazines, triazines, tetrazines and the groups comprising several different heteroatoms such as derived from oxazole, thiazole and furazan.

Among the different compounds corresponding to Formulae I and II, reference is made particularly to (furyl-2)-1 hexadiyne-2,4-one-1; (thienyl-2)-1 hexadiyne-2,4 one-1; and (dioxymethylene-3,4 phenyl)-1 hexadiyne-2,4 one-1.

Applicants have found that the association of at least one heterocycle of the type described with the ketone function and with the acetylenic bonds confers onto the compound a parasitic activity of unexpectedly high efficiency.

The preparation of acetylenic ketones can be carried out by oxidation of the corresponding alcohols as by means of any classical oxidizing agent, such as chromic anhydride or active magnesium dioxide.

These corresponding alcohols can be obtained by several methods such as (a) by the action of the corresponding aldehyde on lithium or sodium derivatives of proper acetylenics in which the reaction is carried out in liquid ammonia or in any other convenient solvent, (b) by the action of the aldehyde on the magnesium derivative of the proper acetylenics, (c) by the action of the 1-bromo acetylenic on the proper acetylenics according to the Cadiot and Chodkiewicz reaction, or (d) by action of an acetylenic magnesium derivative on a low alkyl formate, such as ethyl formate as in the case of the preparation of alcohols corresponding to the ketones of Formula II in which R is the same as R'.

The conjugated acetylenic ketones of this invention, and particularly the (furyl-2)-1 hexadiyne-2,4 one-1 and the (thienyl-2)-1 hexadiyne-2,4 one-1 have anti-fungal activity, especially with respect to *Candida albicans, Sabouraudites gypseum, Scopulariopsis brevicaulis; Trichophyton gypseum granulosum, Trichophyton interdigitale, Aspergillus niger, Aspergillus versicolor, Cercospora malvacearum, Cercospora melonis, Erysiphe graminis, Glomerella cingulata; Plasmopara viticola*, and towards the standardized mixture NF x 41–514.

Herbicidal activity has also been exhibited towards monocotyledone plants such as oats and dicotyledone plants such as the nasturtium and mustard.

The acetylenic ketones of this invention can also advantageously be mixed with other known microbicides. They can be formulated for use in a solvent system such as acetone, benzene, chlorobenzene, chloroform, etc., or they may be applied in their pure state or in admixture with inert carriers such as talcum, sand, kaolin and the like for application as a powder. The compounds can be formulated into a paste or pomade for application.

The following examples are given by way of illustration, but not by way of limitation, of the practice of this invention:

EXAMPLE 1

Preparation of (furyl-2)-1 hexadiyne-2,4 one-1

A solution of 16 g. of pentadiyne-1,3 in 25 ml. of anhydrous ether is added dropwise at room temperature to a 100 ml. solution of anhydrous ether of magnesium ethyl bromide formed of 7 g. of magnesium and 34 g. of ethyl bromide. The mixture is heated at reflux temperature until ethane is no longer given off.

The resulting solution of magnesian derivative of pentadiyne-1,3 is cooled in a salt-ice bath solution to which 24 g. of freshly distilled furfuraldehyde is added slowly with constant agitation. After one hour of agitation, the solution is cooled to room temperature and allowed to stand over night. The derivative is hydrolyzed with the aid of an ice cold solution of ammonium chloride and then extracted with ether. The ether solution is washed with water, dried on sodium sulfate and the ether is then distilled off. After re-crystallization in the petroleum ether, 20 g. of (furyl-2)-1 hexadiyne-2,4 ol-1 are obtained having a melting point of 63° C., corresponding to a yield of 50% by weight of theory.

10 g. of the alcohol are introduced into a suspension of 100 g. of active $MnO_2$ in a liter of acetone which has previously been distilled on potassium permanganate. After 9 hours of agitation at room temperature, the product is filtered and the solvent is distilled off.

After re-crystallization in aqueous alcohol, 5.05 g. of (furyl-2)-1 hexadiyne-2,4 one-1 having a melting point of 73° C. are obtained, corresponding to a yield of 50.5% of theory.

EXAMPLE 2

The anti-fungal activity of the product of Example 1 has been determined on parasitic fungi.

For a first fungus group including *Scopulariopsis brevicaulis* and *Trichophyton interdigitale*, the culture medium (a) is formulated of 100 ml. of Saubouraud medium gelosed at 2% while for a second group of fungus including *Aspergillus niger*, *Cercospora melonis*, and *Glomerella cingulata*, the culture medium (b) is formulated of 100 ml. of malt agar.

The respective culture media were sterilized by autoclave at 110–120° C. for 20 minutes. To each of the sterilized media, there is added at the outlet of the autoclave, .5 ml. of acetone containing the compound of Example 1 in proportions ranging from one part of the compound to 1,000 to 100,000 parts by weight of the culture medium. The separate culture media are agitated and poured into previously sterilized Petri dishes. Two control samples are employed in which one contains the Sabouraud medium gelosed at 2% and to which .5 ml. of acetone has been added per 100 ml. of media while malt agar is added to the other with .5 ml. of acetone per 100 ml. of the medium.

After cooling, the boxes are implanted with approximately equal amounts of mycelium, taken from stock cultures. They are placed in a dry oven at 28° C. and examination was made after 10 days of incubation.

For purposes of comparison, identical tests were carried out with phenyl-1 hexadiyne-2,4 one-1. The results which are given in the following table set forth the minimal concentration of the compound which operates completely to inhibit growth of the microorganisms after 10 days of incubation at 28–30° C.:

| Parasites | Minimal concentrations of— | |
| --- | --- | --- |
| | (Furyl-2)-1 hexadiyne-2,4 one-1 | Phenyl-1 hexadiyne-2,4 one-1 |
| *Scopulariopsis brevicaulis* | 1/32,000 | 1/16,000 |
| *Trichophyton interdigitale* | 1/40,000 | 1/20,000 |
| *Aspergillus niger* | 1/50,000 | 1/12,500 |
| *Cercospora melonis* | 1/16,000 | 1/4,000 |
| *Glomerella cingulata* | 1/32,000 | 1/16,000 |

The results set forth in the foregoing table establish that the anti-fungal activity of the (furyl-2)-1 hexadiyne-2,4 one-1 is two to four times greater than that of phenyl-1 hexadiyne-2,4 one-1.

EXAMPLE 3

The herbicidal activity of the (furyl-2)-1 hexadiyne-2,4 one-1 has also been determined on the oats (monocotyledone), the nasturtium (dicotyledone), and the mustard (dicotyledone) sown in pots having a dimension of 27 x 30 cm.

When the cotyledonaries leaves are well formed, that is, when the terminal buds appear, the compound in a 3% aqueous suspension is applied by atomization in an amount corresponding to 30 kg./ha. (hectare) of active matter.

The destructive coefficient was determined by comparison with untreated controls both 8 days and one month after treatment. After 8 days, a fading of the major part of the growth is noticed with the untreated plants and after one month all three of the plants exhibited noticeable yellowing.

EXAMPLE 4

Preparation of (thienyl-2)-1 hexadiyne-2,4 one-1

The procedure is the same as that of Example 1 except that 28 g. of α-thiophenaldehyde was substituted for the furfuraldehyde.

36 g. of (thienyl-2)-1 hexadiyne-2,4 ol-1 were obtained corresponding to a yield of 82% by weight of theory. The latter alcohol is oxidized with 360 g. of active $MnO_2$ in suspension in 3 liters of acetone.

After re-crystallization from aqueous ethanol, 23 g. of (thienyl-2)-1 hexadiyne-2,4 one-1, having a melting point of 74° C. were obtained, corresponding to a yield of 64% by weight of theory.

EXAMPLE 5

The anti-fungal activity of the compound of Example 4 was determined as in Example 2 using the culture medium (b). The minimal concentrations of compound for inhibiting the growth of the microorganisms are set forth in the following table using phenyl-1 hexadiyne-2,4 one-1 as a comparison:

| Parasites of vegetables | Minimal concentrations of— | |
| --- | --- | --- |
| | (Thienyl-2)-1 hexadiyne-2,4 one-1 | Phenyl-1 hexadiyne-2,4 one-1 |
| *Aspergillus niger* | 1/50,000 | 1/12,500 |
| *Cercospora malvacearum* | 1/64,000 | 1/32,000 |
| Melange NF x 41–514 | 1/12,500 | 1/6,600 |

From the foregoing results, it will be obvious that the (thienyl-2)-1 hexadiyne-2,4 one-1 is two to four times more active than the phenyl-1 hexadiyne-2,4 one-1.

EXAMPLE 6

The procedure is the same as that set forth in Example 1. The magnesian derivative of pentadiyne-1,3 is obtained by reaction of 5.3 g. of magnesium, 26.2 g. of ethyl bromide and 12.2 g. of pentadiyne-1,3 in 200 ml. of anhydrous ether.

To the solution of the magnesian derivative of pentadiyne-1,3, 28.5 grams of piperonal are added and 39 g. of (dioxymethylene-3,4 phenyl)-1 hexadiyne-2,4 ol-1 are obtained corresponding to a yield of 96% by weight of theory.

The alcohol is oxidized in the presence of 390 g. of active $MnO_2$ in suspension in 3.9 liters of acetone. After recrystallization in a mixture of benzene and petroleum ether, 19.35 g. of (dioxymethylene-3,4 phenyl)-1 hexadiyne-2,4 one-1, having a melting point of 128° C., are obtained corresponding to a yield of 15% by weight of theory.

EXAMPLE 7

The anti-fungi activity of the product obtained in Example 6 was established on *Aspergillus niger* in the procedure set forth in Example 2 using the (b) culture medium. For purposes of comparison, identical tests were carried out with phenyl-1 hexadidyne-2,4 one-1.

The minimal amount of (dioxymethylene-3,4 phenyl)-1 hexadiyne-2,4 one-1 for completely inhibiting growth of *Aspergillus niger* was found to be one part per 25,000. This is to be compared with the amount of one part per 12,500 for the (phenyl-1) hexadiyne-2,4 one-1, indicating that the compound of this invention is twice as effective towards *Aspergillus niger* as phenyl-1 hexadiyne-2,4 one-1.

It will be understood that invention is to be found not only in the new and novel compounds produced in accordance with the practice of this invention but also in their use as an anti-fungicide or parasiticide.

We claim:
1. A conjugated acetylenic ketone having the general formula R—CO—C≡C—C≡C—R' in which R is a heterocycle selected from the group consisting of furyl, thienyl and dioxymethylenephenyl and R' is a radical selected from the group consisting of methyl and ethyl.
2. The conjugated acetylenic ketone (furyl-2)-1 hexadiyne-2,4 one-1.
3. The conjugated acetylenic ketone (thienyl-2)-1 hexadiyne-2,4 one-1.
4. The conjugated acetylenic ketone (dioxymethylene-3,4 phenyl)-1 hexadiyne-2,4 one-1.

References Cited

Von Richter, V.: The Chemistry of the Carbon Compounds, N.Y. Elsevier (1947), p. 14–15.

Tanaka et al.: Antibiotics and Chemotherapy, vol. 9, pp. 151–5 (1959).

Guser et al.: Chem. Abstracts, vol. 59, p. 3800 (1963).

Nash et al.: J. of Chem. Soc., pp. 2983–6 (1965).

ALEX MAZEL, Primary Examiner

B. I. DENTZ, Assistant Examiner

U.S. Cl. X.R.

260—340.5, 347.8; 424—285